April 19, 1927.
G. A. HOLMES
1,625,026
MACHINE FOR SHOE SOLES
Filed June 16, 1926
2 Sheets-Sheet 2
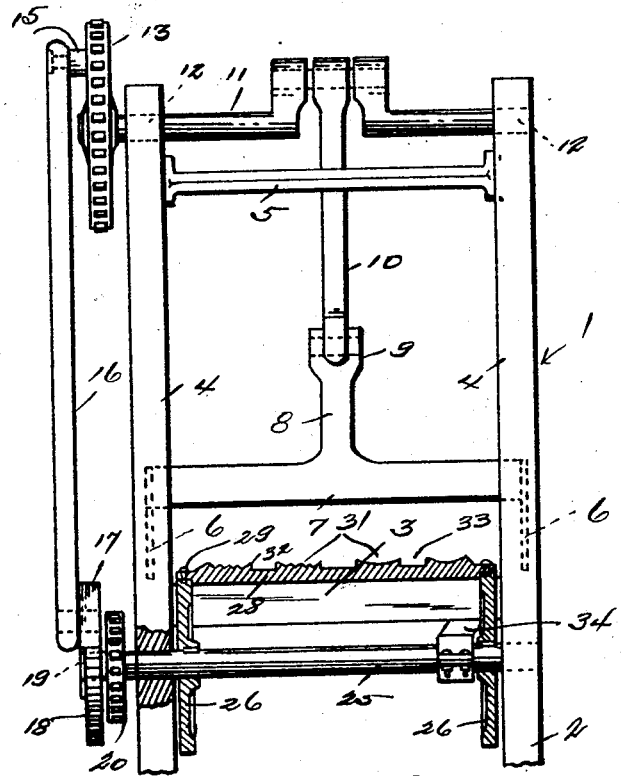
-FIG-2-
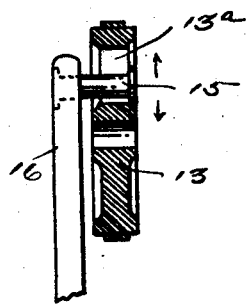
-FIG-4-
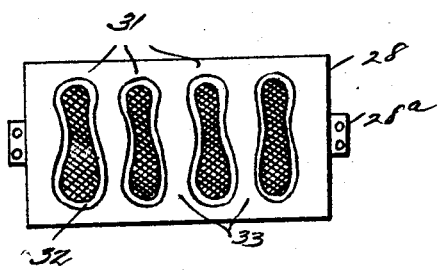
-FIG-3-
INVENTOR.
GEORGE A. HOLMES,
BY
ATTORNEY.

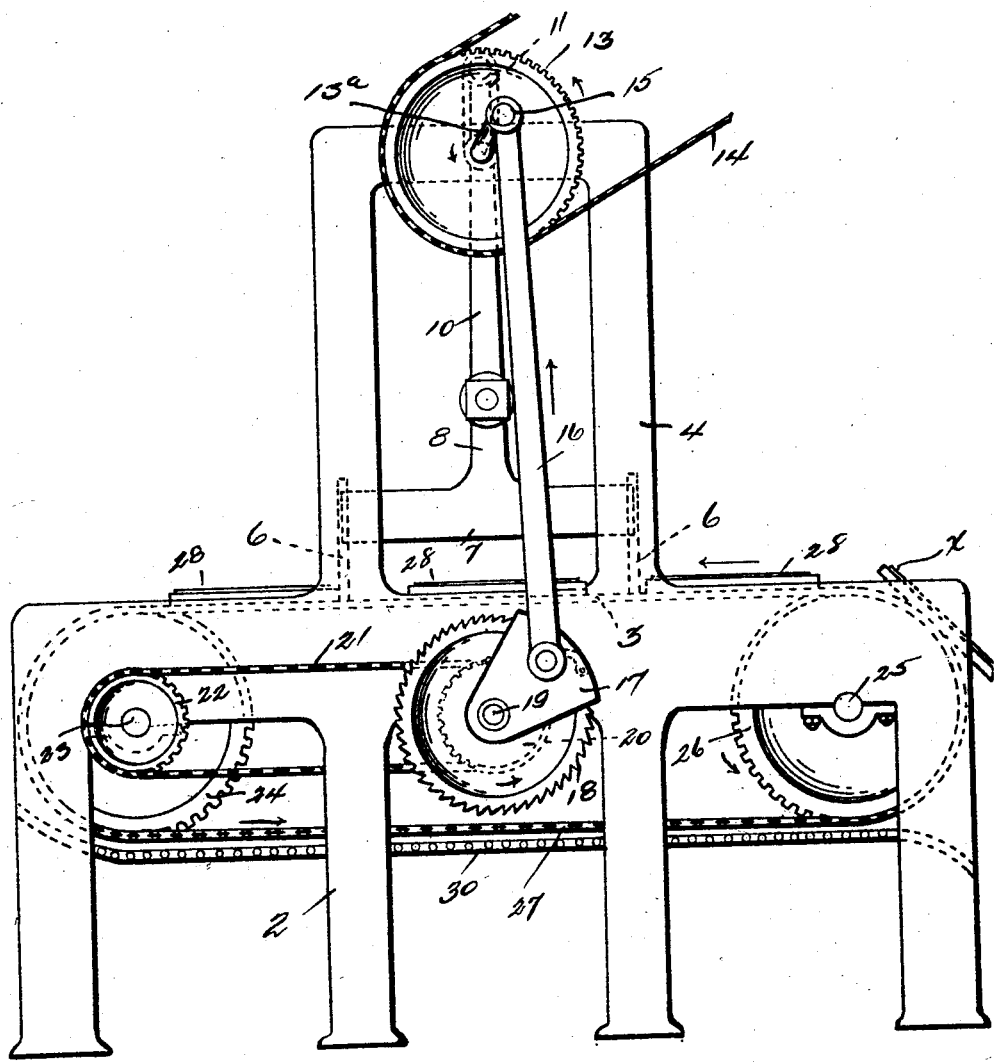
FIG-1-

Patented Apr. 19, 1927.

1,625,026

UNITED STATES PATENT OFFICE.

GEORGE A. HOLMES, OF NAUGATUCK, CONNECTICUT.

MACHINE FOR SHOE SOLES.

Application filed June 16, 1926. Serial No. 116,389.

My present invention, in its broad aspect, has reference to improvements in the art of stamping and die cutting machines of the type adapted to cut and form rubber soles for foot wear (or soles formed of other material); and more particularly it is my purpose to provide a machine of this character which will receive rubber or other stock from a calender mill and cut, stamp, mold or die rubber soles (or soles of other material) therefrom having each a bevel, skived or otherwise finished edge and an engraved or knurled and properly formed surface; in other words my machine is adapted to receive ordinary calendered stock and form therefrom in any quantity desired the completed soles for footwear, thereby effecting a saving in time, material and labor in the fabrication of such articles.

Other and equally important objects of my invention may be briefly defined as follows: first, my machine is designed to form a number of soles for foot wear at each operation; second, means are provided for automatically advancing the dies and calendered stock; third, provision is made for saving and removing the cuttings or scrap; fourth, improved means are utilized for mounting and positioning my several cutting dies; and fifth, the number of parts making up my machine have been reduced and those parts refined to the end that repairs are facilitated, and a saving effected in initial cost of manufacture and operating expense.

To these and other ends, my machine consists in the construction, arrangement and combination of parts described hereinafter, illustrated in the drawings, and defined in the claims forming a part of this specification.

One embodiment of my invention is represented by way of example in the accompanying drawings, wherein—

Figure 1 is a side elevation of my machine,

Figure 2 is an end view thereof, partly in section, to show more clearly the construction of certain of its parts, Figure 3 is a detail view of one of my die cutting plates, and Figure 4 is a detail view, partly in section, of my gear and slot connection for the ratchet drive arm.

In the drawings wherein like characters of reference are used to designate like or similar parts throughout the several views—

The numeral (1) designates generally the frame of my machine which is designed to be cast as a unit, and which has a base portion (2) including supporting legs, a transverse table or platform (3) on top of the base and spaced from the ends of the frame, and vertical relatively parallel spaced standards (4) rising from the base on either side of the platform. The frame is braced transversely by struts or reinforcing members (5).

The respective standards (4) of the frame are channeled or formed with guide ways (6) for receiving and guiding a press head (7). The press head (7) is designed to reciprocate between the standards, and to accomplish this end the press head is formed with a shank (8) the end of which is bifurcated as at (9) to pivotally receive the arm (10) of a crank assembly (11) which is journalled at its ends at (12) in openings provided in the tops of the standards (4). In order that the crank assembly may be actuated to reciprocate the press head (7) there is keyed to one end thereof a cog wheel (13) over which is trained a chain drive (14) from a suitable source of power (not shown).

The cog wheel (13) is radially slotted as at (13$^a$) to loosely receive a pin (15) carried in the upper end of the drive arm (16) of a ratchet (17) which engages the teeth of a ratchet wheel (18) mounted on a shaft (19) extending transversely of and journalled in the frame beneath the platform or table (3). A suitable dog is carried by the ratchet for the usual purpose. The shaft (19) has also mounted thereon a cog wheel (20) over which is trained a chain drive (21) to another cog wheel (22) mounted on a shaft (23) hung by brackets to one end of the frame (1). The shaft (23) has mounted thereon cog wheels (24), and at the opposite end of the frame a similar shaft (25) has mounted thereon cog wheels (26). A chain belt structure (27) is trained over the two sets of cog wheels (24) and (26), and mounted thereon are a plurality of uniformly spaced apart die cutting plates (28). It will be seen from the foregoing description of structure that when the crank assembly (11) is actuated the press head (7) is reciprocated toward and away from the platform or table (3); and that at the same time the ratchet drive arm (16) is moved up when the press head moves up, and down when the press head moves down, this through the instrumentality of the pin in the slot (13ª) of cog wheel (13). The reciprocation of the drive arm serves to advance the chain belt structure (27) upon each upward movement of the press head (7) to position a die plate beneath the press head on its downward cycle, and I have so arranged the slot in the cog wheel (13), and the cog wheel with respect to the crank assembly (11) that there is some lag between the advancement of the die plate and the movement of the press head thereby preventing any wiping contact when the press head engages the die plate. In practice the gear ratio is such that the ratchet wheel (18) is advanced on half turn by the ratchet (17) for each cycle of reciprocation of the press head.

My die plates are formed of steel, and each plate has end ears (28ª) through which attaching devices (29) are designed to extend to secure the same to the chain belt structure (27). Such attaching means may be bolts or any other suitable means. As has been indicated when the cog wheels (24) and (26) are rotated through the instrumentality of ratchet wheel (18) and ratchet (17), the chain belt (27) moves thereabouts and over the table or platform (3), and since the die plates must make the turn as the chain belt passes over the cog wheels (24) and (26) my peculiar attaching means for the plates are essential since thereby the plates are caused to properly position themselves as indicated at (x) to prevent binding. Beneath the lower reach of the chain belt (27) and spaced therefrom is an apron (30) of the rubber covered ball bearing type which is designed to support the weight of the die plates as they pass from cog wheels (24) to cog wheels (26); or on their return cycle after having passed across the table or platform (3); this relieves strain upon the chain belt (27). One end of the apron is trained upwardly and the other end downwardly to facilitate entrance and egress of the plates. The apron is of substantially the same width as the plates. The table or platform (3) is cut away or channeled to permit the chain belt structure (27) to pass thereover with the bottoms of the plates resting against the top surface of the table so that they are properly supported for receiving the stroke of the press head (7).

The die plates (28) are each formed with sets of dies or molds (31) having edge cutters (32) for forming the bevel on the sole and spaces (33) therebetween for receiving the scraps. They may be of various sizes and designs. As here shown the sole is to be knurled in the manner usually found on rubber over shoes. A suitable friction element (34) is engaged about the shaft (25) to take up any lost motion which might occur to the end that the plates will be properly positioned on the platform.

In operation calendered rubber (or other) stock is fed to the die plates directly from the calender mill, and the die plates are advanced by movement of the chain belt (27) to be positioned in turn beneath the press head (7) upon the table or platform (3) of the frame. The press head (7) moves down to engage the die plate therebeneath and consequently mold and cut the stock thereon to correspond with the design of the dies thereon. The scrap material passes to the spaces (33) on the plates and is removed when the plates pass from the table. The soles are then removed from the dies and the plates pass from the table about the cog wheels (24) to the apron (30) then to cog wheels (26), are charged from the calender mill and are again acted upon by the press head completing a cycle of operation. In practice the rubber soling stock is of a gauge slightly heavier than the desired finished sole. The sheet of stock from the calender mill is run directly therefrom to the table or platform (3) upon the die plates and the press head stamps out the completed soles as the die plates are advanced one by one across the table by the ratchet. Attention is here called to the simplicity of my machine, the relatively few parts necessary to accomplish the desired ends, and the fact that there are no parts so concealed or hidden that repairs and cleaning can be accomplished with facility.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

Having described my invention and its objects with such attention to detail as will thoroughly acquaint one skilled in the art with its construction and advantages, I claim:—

1. In a machine of the type described, a frame, a table provided on the frame, a press head supported on the frame for reciprocation toward and away from the table, an endless conveyer adapted to slide across the table beneath the press head and having a plurality of die plates thereon, rotating elements arranged respectively at the ends of the frame for receiving the conveyer, an apron carried by the frame and beneath the conveyer for direct contact with the die plates for supporting the same, means for actuating the conveyer, and means for reciprocating the press head.

2. In a machine of the type described, a frame, a table provided on the frame, a press head supported on the frame for reciprocation toward and away from the table, an endless conveyer adapted to slide across the table beneath the press head and having a plurality of die plates thereon, rotating elements arranged respectively at the ends of the frame for receiving the conveyer, an apron having anti-friction devices carried by the frame, parallel to the table and beneath the conveyer for direct contact with the die plates for supporting the same, means for actuating the conveyer, and means for reciprocating the press head.

3. In a machine of the type described, a frame, a table provided on the frame, a press head supported on the frame for reciprocation toward and away from the table, an endless chain conveyer adapted to slide across the table beneath the press head, a plurality of die plates attached at one point in each of their ends to the conveyer, cog wheels arranged respectively at the ends of the frame for receiving the conveyer, an apron carried by the frame for supporting the die plates and provided with anti-friction means to facilitate movement of the plates thereon, the ends of the apron being curved respectively toward the conveyer and away from the same, means for actuating the conveyer, and means for reciprocating the press head.

In testimony whereof, I affix my signature hereunto.

GEORGE A. HOLMES.